United States Patent [19]

Baum et al.

[11] 4,317,416
[45] Mar. 2, 1982

[54] CONNECTION MEANS FOR ASSEMBLING FURNITURE

[75] Inventors: Carl M. Baum, Kings Point; William C. Rohe, Hicksville, both of N.Y.

[73] Assignee: Vanguard Diversified, Inc., Brooklyn, N.Y.

[21] Appl. No.: 104,108

[22] Filed: Dec. 17, 1979

[51] Int. Cl.³ .................... A47B 13/00; F16B 12/10
[52] U.S. Cl. .................... 108/157; 248/223.1; 312/195; 403/407
[58] Field of Search .......... 108/157, 155, 159; 24/230 BC, 230 AL, 205.18, 205.17; 312/140, 111, 195; 248/222.4, 223.1; 403/407, 406, 405

[56] References Cited

U.S. PATENT DOCUMENTS

| | | | |
|---|---|---|---|
| 692,053 | 1/1902 | Forster | 312/111 |
| 1,276,312 | 8/1918 | Ballenberg | 403/407 |
| 1,571,762 | 2/1926 | Driscal | 248/222.4 |
| 1,873,932 | 8/1932 | Hunter | 312/195 |
| 2,620,248 | 12/1952 | Mutchnik | 403/407 X |
| 2,621,357 | 12/1952 | Stuman | 248/223.1 |
| 2,964,368 | 12/1960 | Heyer | 108/155 |
| 3,506,291 | 4/1970 | Mehelich | 403/407 X |
| 3,731,956 | 5/1973 | Hanley | 312/111 |

*Primary Examiner*—Francis K. Zugel
*Attorney, Agent, or Firm*—Brooks, Haidt, Haffner & Delahunty

[57] ABSTRACT

A desk top is connected to the top flanges of a pedestal by passing appropriately located projecting studs on the underside of the desk top through correspondingly located slots on the pedestal flanges, and then securing the connections by several locking clips, which respectively wedge under a pair of stud heads and press against the pedestal flange. Each locking clip spans across and secures a pair of adjacent studs, and is made of thin resilient material having a pair of spring portion protrusions which respectively fit beneath the adjacent studs. Each of the spring portions has a keyhole aperture by which the clip is mounted on the pair of studs and is pushed laterally to secure the connection. The connection is locked by a detent of the clip which engages an appropriately located cutout of the flange.

5 Claims, 8 Drawing Figures

CONNECTION MEANS FOR ASSEMBLING FURNITURE

FIELD OF THE INVENTION

This invention relates to assemblable and disassemblable furniture, sometimes referred to as "knockdown" or "KD" furniture, and more particularly to techniques for connecting the cofacing parts thereof.

Although the invention was made while attempting to improve the ease and accuracy of assembly of metal desk furniture for use in offices and in the home, and therefore will be described in connection with such use, it will be understood that the invention may have other applications, such as in assembling the parts of wood furniture, or furniture made of laminated or plastic materials.

BACKGROUND OF THE INVENTION AND THE PRIOR ART:

Large pieces of office furniture such as desks are usually manufactured and shipped to the customer in the form of their component parts, which are then assembled to complete the furniture. For example, a typical 30"×60" metal desk has a pair of pedestals to which the desk top must be attached after the three component parts have arrived at either the wholesaler's, the retailer's, or the ultimate customer's location. For the purpose, a separate package of screws, together with an instruction sheet, accompanies the several components when shipped, and the purchaser finds he must align the screw openings in the top flanges at the sides of each pedestal with correspondingly spaced openings in the underside of the desk top, and insert and tighten the screws to attach the parts.

Assuming the parts have been prefabricated accurately so that all of the corresponding screw openings align with each other to receive the screws, such conventional assembly is time-consuming and, because the use of a tool is involved, requires the services of a mechanic to assure proper fit and tightness of assembly. In some circumstances, the buyer of the furniture may not even have the proper size screwdriver on hand.

Moreover, if at a later time the pedestals must be removed to change the desk from being a desk of one-hand to being of the other, or to substitute a typing-return module for one of the desk pedestals, these tightened screws must be loosened and removed to disassemble the desk. Such is considered a laborious task, also involving the use of tools and the skill of a mechanic.

The foregoing disadvantges of the conventional technique for assembling or disassembling a desk are in addition to the difficulty of manufacturing the components accurately, so that the respective screw holes align with each other as the parts to be assembled are brought together, as aforesaid.

OBJECTS OF THE INVENTION

Accordingly, an object of the invention is to provide a means for more conveniently and more rapidly assembling and, if need be, disassembling such furniture components. That is, it is intended by the present invention to eliminate the need for such laborious screw-attachment of the parts, and to provide a means for assembling such furniture which does not involve the use of tools. Thus, the time for assembly should be substantially reduced. For example, whereas conventional assembly and attachment of the components using screws as previously described may take perhaps from about one-half hour to about forty-five minutes, the time for assembly of the same components having connection means in accordance with the present invention should require no more than about two minutes without the use of any tools.

Moreover, the manner of connection should be readily understandable to the layman upon sight of the connector parts, or upon very elementary instruction.

In addition, the connector parts should be such that small dimensional or placement deviations during manufacture of the furniture components and their connector parts will be insignificant or easily accomodated during assembly. Of course, the connector parts and arrangement must be economical to manufacture and furnish, so that the cost of the furniture remains substantially the same.

BRIEF DESCRIPTION OF THE INVENTION

Briefly describing the invention in one of its embodiments, an appropriate number of locating studs, conveniently in the form of screws, are fastened with their heads projecting from the surface of one of the two furniture components which are to be connected together in face-to-face relation, and the flanges of the other furniture component are provided with correspondingly located oversized openings, preferably slots, for mounting the flanges on the respective of the studs when the components are brought into connecting engagement. The height of the studs is such that their laterally projecting heads are a uniform distance above the flange surfaces of the second furniture component when the parts are in face-to-face relation with the stud heads projecting through the flange openings.

Slider-type locking clips are then mounted on the respective studs and are pressed laterally along these flange surfaces and into engagement beneath the stud heads to firmly secure the furniture components against relative movement, and to lock the parts together. These locking clips or sliders are essentially flat and thin, but include upwardly and then downwardly bent spring portions at locations along their lengths, to be pressed beneath each stud when the slider connection is made. Each such spring portion, which is formed by a bend of the slider material out of its normally flat plane, is provided with a keyhole opening, the larger circular portion of which permits the stud head to pass therethrough when the slider is placed over the stud, and the slotted neck portion of which will engage the underside of the stud head when the slider is manually pressed in lateral direction to secure and lock the connection. The slider material is preferably flat steel strip, and the bending thereof to form each spring portion produces an upwardly projecting arcuate bulge which renders the material vertically flexible at that location. Considering that the slider height at the spring arc is slightly greater than the projecting height of the underside of each stud head above the flange surface of the connected furniture component, the downward flexing of the slider arc as it is moved laterally beneath the stud head exerts holding pressure between the stud and the flange. In the presently preferred embodiment of the invention, each arcuate spring portion includes a horizontal flat portion which defines its apex, and which seats against the correspondingly flat underside of the stud head which it engages, thus to increase the surface area and resulting contact friction and holding pressure between the parts.

Each locking clip or slider has an upturned end providing a surface for finger-pressure when manually making or releasing the slide connection.

To ensure locking of the locking clips in their intended locked position beneath the stud heads, a detent is formed to project below the flat underside surface of the clip which interfaces with the upwardly facing flange surface of the furniture component which is being connected, and a correspondingly shaped cutout is formed in the flange at a location to receive the detent as the clip attains its locked position during the engagement movement. Thus, and due to the resiliency of the steel locking clip, a distinct "click" is heard when the clip has been properly engaged.

In preferred embodiments of the invention, each locking slider or clip has two of the referred to keyholed spring portions in spaced-apart relation along its length, so that the one slider simultaneously engages and locks under the heads of two studs. Thus, for example, to connect one desk pedestal to the underside of a desk top, only four elongated sliders are used to make the connections at eight stud locations. Four of the studs are located on each side of the pedestal, which has respective outwardly projecting flange portions extending along its upper side edges by which the connections are made using the stud openings therethrough, as has been described. The eight studs are accurately located on the underside of the desk top by machine installation, with their heads projecting at a uniform height, to ensure that the studs will match up with these correspondingly located stud openings along the pedestal flanges, and that the locking clips will exert substantially uniform locking pressure.

The preferred embodiment of the slider or locking clip further includes an additional pair of keyholed spring portions, of different height as compared with the first pair of such spring portions of the slider, rendering the same slider capable of being used with either of two thicknesses of material of which the connected flange could be made, thus permitting the same height of projection of the studs on all desk top components so that any top may be connected to any pedestal, regardless of the flange thickness of the latter. It will be seen that the same locking detent on the slider for use in conjunction with the first pair of spring portions will similarly serve the second pair of spring portions. Thus, the need for additional detents and their comating flange apertures is avoided, reducing the chances for inaccuracies of fit between the connected parts.

These and other objects, features and advantages of the invention will become more readily apparent from the following detailed description of preferred embodiments, in which reference will be made to the accompanying drawings. In the drawings.

Figure 1:
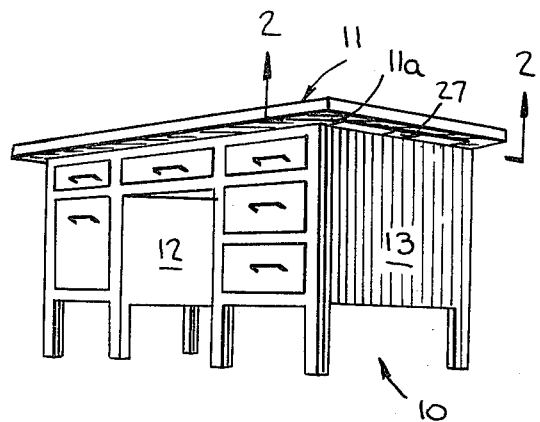
FIG. 1 is a persepctive showing of a metal desk having components assembled in accordance with the invention.

Referring first to FIG. 1, a common office-type desk assembled in accordance with the invention is generally indicated by reference numeral 10. Although it might have only one pedestal, or might incorporate a typing-return module (not shown), or might be oppositely arranged or have other features, the desk 10 as illustrated is a so called "double-pedestal" desk. It has a single desk top 11 supported on a pair of laterally spaced apart pedestals 12 and 13, the latter being attached to the underside 11a of the top 11. It should also be understood that although the desk 10 (excepting its top 11) is made principally of metal such as steel, its pedestals 12 and 13 might be made of other materials such as wood, or a common laminated material, or even plastic material. The top 11 is usually made of a thick or laminated piece of wood or particle board having wood-grained plastic surfaces, but might also be of hollow or bended metal construction.

Figure 2:
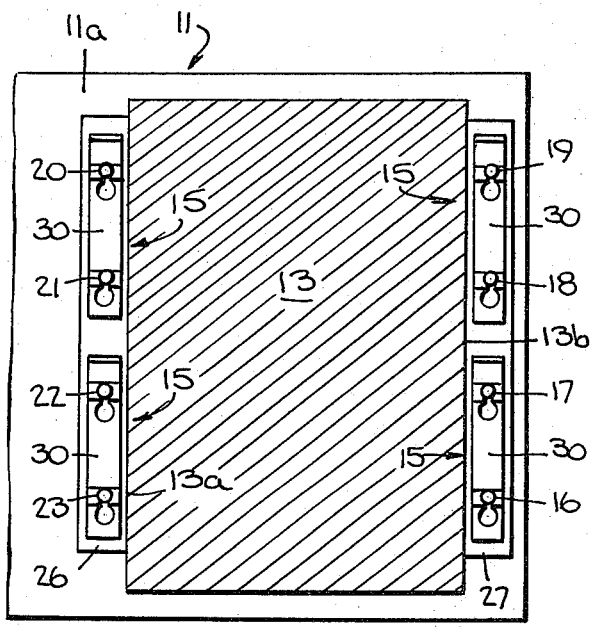
FIG. 2 is an enlarged and fragmentary cross-sectional view of the underside of the desk as seen from lines 2—2 in FIG. 1.

Referring now to FIG. 2 which is a fragmentary view of the underside 11a of the desk, the invention provides connection means, generally indicated by reference numeral 15, for conveniently and rapidly connecting together any two of the components of the furniture, such as the desk pedestal 13 to the top 11. Thus, it will be understood that the other pedestal 12 is connected to the underside of the top 11 in the same manner, and that any two other suitable components of the furniture, such as a modesty panel (not illustrated), or a typing-return module (not illustrated), would be similarly connected either together, or to the desk top.

In the embodiment shown in FIG. 2 there are eight points of connection 16–23, inclusive, between the underside 11a of the desk top 11 and the upper edges of the pair of metal side panels 13a, 13b of the pedestal 13, four being on each side of the pedestal as shown. Of course, any fewer number, or greater number of connection points might be used, as might be more appropriate where different furniture components, or differently sized components, are to be connected. However, the illustrated eight-point attachment between the top of the desk and any typical drawer-pedestal, as shown, has been found entirely satisfactory for the purpose.

Figure 3:
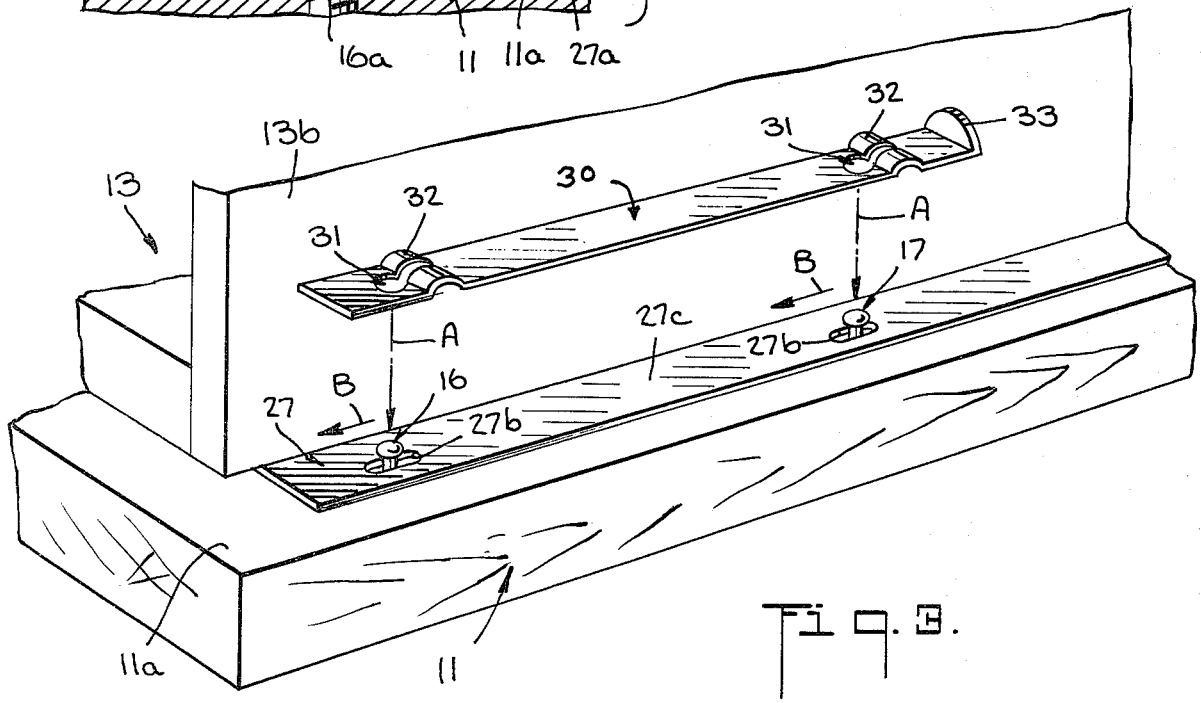
FIG. 3 is an inverted, fragmentary and exploded view in perspective, to a further enlarged scale, to illustrate a typical connection in the desk assembly of FIGS. 1 and 2.

The desk is more easily assembled in the upside-down position as indicated in FIG. 3, the top 11 being placed on the floor with its underside surface 11a facing upwardly, and the pedestals 12 and 13 being inverted as the connections are made.

Figure 4:
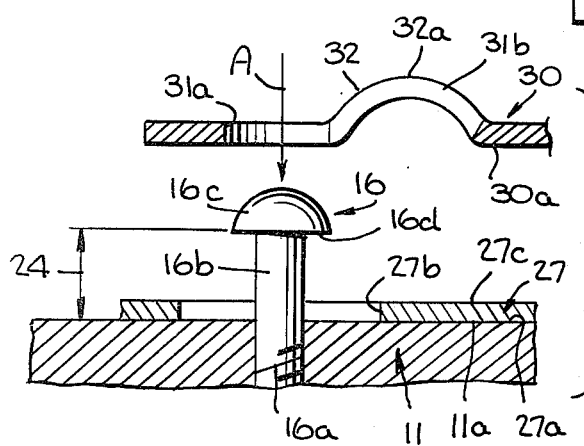
FIG. 4 is a still further enlarged and fragmentary exploded view, in side elevational cross-section, to illustrate the connection means of FIG. 3 in greater detail.
Figure 5A:
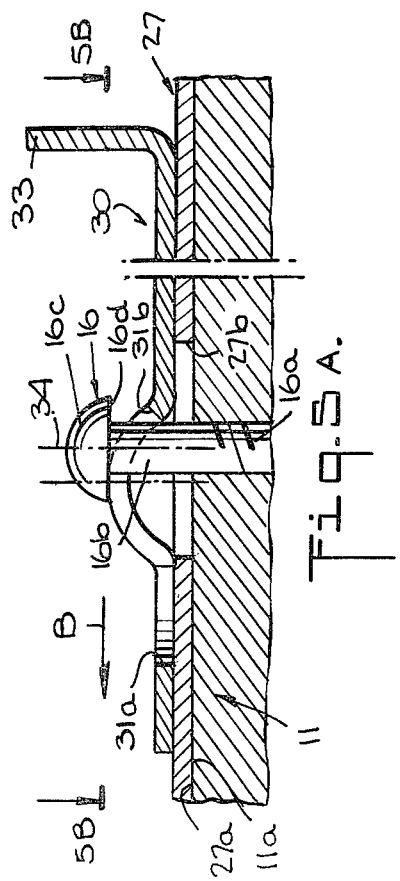
FIG. 5A is a view similar to FIG. 4 to further illustrate the same connection means.

The eight points of connection illustrated in FIG. 2 takethe form of separate studs, each respectively represented by the same reference numerals 16–23, which are rigidly attached as, for example, by threads 16a on its shank 16b as seen in FIGS. 4 and 5A, extending into the underside 11a of the desk top 11. The shank 16b of each stud projects a common distance outwardly from the underside surface 11a of the desk top 11, so that the laterally projecting stud head 16c provides a shoulder 16d at its underside, facing the desk top underside surface 11a, for use in making the connection as will be described. The common distance of the shoulders, such as shoulder 16d, of all of the studs 16–23 away from the surface 11a is indicated by reference numeral 24 in FIG. 4. As will be noted, the studs 16–23 may conveniently be in the form of wood screws.

Referring again particularly to FIGS. 2 and 3, it is seen that respective laterally projecting metal flanges 26 and 27 are formed extending along the respective upper edges of the pedestal side panels 13a, 13b as by bending a portion of each side panel outwardly as will be understood from the drawings. Of course, the flanges might also be separate angle-iron pieces which are attached along the respective upper edges of the pedestals, if desired as, for example, where the pedestals are made of wood or material other than steel. These flanges 26 and 27 provide thin and flat laterally projecting portions of the pedestal 13 in flush, face-to-face relation, along their upperside surfaces 27a, against the underside surface 11a of the desk top 11, as shown. The flanges have respective spaced-apart apertures 27b therethrough, in the form of elongated, closed-ended slots as shown in FIG. 3, which are wide enough to pass over the respective heads of the studs 16–23. The spacing apart of these stud apertures along the lengths of the flanges 26 and 27 correspond with the locations of the studs 16–23 when the furniture components are brought together for joining, as will be understood. When the pedestal is received on the studs 16–23, the difference between the smaller shank diameters of the studs and the widths of these slots 27b permits the exact location of the pedestal to be adjusted slightly in the side-to-side direction. The slots also have elongated shape to accommodate slight adjustment of the position of the pedestal on the desk top in the front-to-rear direction, as may be necessary for accurate locating.

The pedestal flanges 26, 27 are locked on to the projecting studs 16 several slider-type locking clips 30. In the embodiment seen in FIG. 2, four such locking clips 30 are used to effect the connections at the eight stud locations 16–23, each clip 30 tightly pressing and securing the pedestal flange 26 or 27 against the desk top underside 11a at two stud locations.

Referring to FIGS. 3 and 4, each clip 30 is preferably made from a thin strip of resilient material, such as steel. The clip is essentially flat, its thickness being less than the height of any stud shoulder 16d above the cofacing underside surfaces 27c of the pedestal flanges. For example, a satisfactory clip 30 is made from 0.050" thick cold rolled steel strip, ½" wide ×7⅛" long.

Figure 5B:
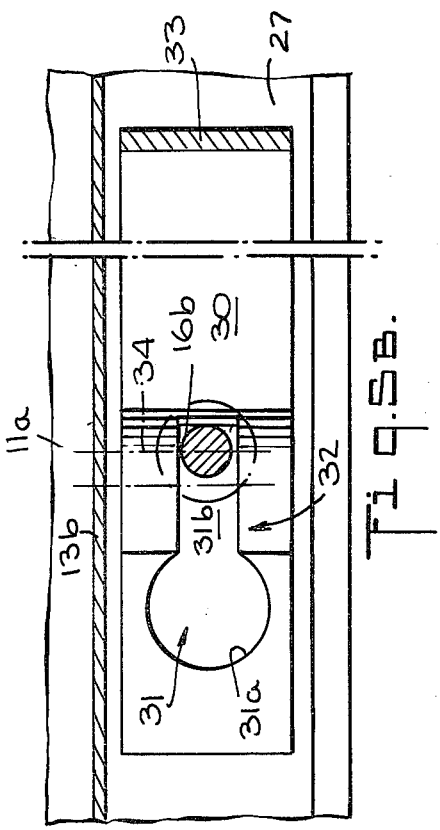
FIG. 5B is a fragmentary plan view in partial cross-section as seen from line 5B—5B in FIG. 5A.

A pair of keyhole-shaped mounting slots 31 is formed in each elongated clip 30 in longitudinally spaced-apart relation corresponding to the spacing distance between the two studs, such as studs 16 and 17 in FIG. 3, which the clip will engage. Referring briefly to FIG. 5B, the circular aperture portion 31a of each keyhole slot 31 has a diameter larger than that of the stud 16c to pass thereover, and the width of the slot portion 31a of the keyhole shape is smaller, being only sufficient to be slidable on the stud shank 16b. For example, where each stud is a No. 6 type A self-tapping screw, its head is 0.210" to 0.220" diameter, and the keyhole aperture portion 31a is 0.250" diameter to pass thereover. The slot portion 31b of the keyhole shape is 5/32" wide, to be slidable on the screw shank. Moreover, although the circular aperture portion 31a is formed through the flat body of the clip, the slot portion 31b is formed in, and extends across an arcuately-shaped protrusion, out of the initial plane of the material, which forms a spring portion 32 of the clip 30.

As initially formed, the height of the apex 32a of the arcuate protrusion or spring portion 32 above the underside 30a of the clip (FIG. 4) is greater than the height of the stud head shoulder 16d above the underside surface 27c of the pedestal flange, so that the spring portion 32 will exert clamping pressure against the stud shoulder 16d and the flange surface 27c when it is wedged therebetween.

Referring to FIGS. 3 and 4, the pair of keyhole slots 31 in each clip 30 face in the same direction and, when a locking connection is to be made, the clip is placed on its intended associated pair of locking studs 16, 17 by passing the keyhole aperture portions 31a downwardly over the studs, as indicated by the arrows A in FIGS. 3 and 4. Referring now to FIGS. 5A and 5B, the clip 30 is then wedged and locked in its engagement between each stud and the pedestal flange surface 27c by sliding the clip laterally, in the direction of arrows B in FIGS. 3 and 5A, until the spring portions 32 move fully under the stud shoulders 16d. The sliding movment is effected by finger pressure on the upturned finger-engagement portion 33 on the clip 30 and, during the movement, the clip is guided by the slidable engagement of the slot portions 31b on the stud shanks.

The tight-fitting engagement of each clip spring portion 32 between the stud shoulders 16d and the pedestal flanges and, hence, the tightness of fit of the pedestal flanges 26 and 27 against the underside surface 11a of the desk top 11, is maintained by the locking action of each clip 30 as the apex 32a of its spring portion 32 passes beyond the centerline, indicated by reference numeral 34 in FIGS. 5A and 5B, of its associated stud 16 during the engaging and locking movement. That is, as the spring portion apex 32a engages the stud shoulder 16d during the lateral sliding movement, the spring portion 32 is depressed, the base of its arcuate shape being slightly spread to permit the deflection. Continued movement by the spring portion apex 32a to the location shown in FIGS. 5A and 5B at which it is beyond the centerline of the stud permits the spring portion apex 32a to again move upwardly, in response to the resiliency of its arcuate shape, to substantially lock the clip in its engaged position. That is, the slotted neck portion 31b of each keyhole opening 31 is long enough to extend across and beyond the apex 32a of the arcuate spring portion 32 so that, as the arc 32 is pushed to and beyond the location at which its apex is wholly beneath the stud head, the depressed and flexible spring portion partially returns the apex towards its undeflected height to snap into a locked condition against the far side of the connection shoulder 16d of the stud head. Of course, the shape of the spring portion 32 is not fully restored, so that its spring pressure is retained. But the upward movement of the side edges of the slot 13b against the far edge of the stud head shoulder 16c does effect a locking action, since considerable additional pressure is required to again deflect the spring-portion to release the connection. Thus, the furniture components 11 and 13 continue to be pressed tightly against each other and are locked together by the locking clip 30.

When all four of the locking clips 30 have been so engaged, it will be found that the pedestal 13 is firmly secured to the desk top 11. When both pedestals 12 and 13 are similarly secured, the assembled desk 10 is turned right-side up ready for use.

Disassembly of either pedestal 12, 13 from the desk top is effected by sliding the locking clips 30 in opposite direction, to release their engagement, as will be apparent.

Figure 6A:
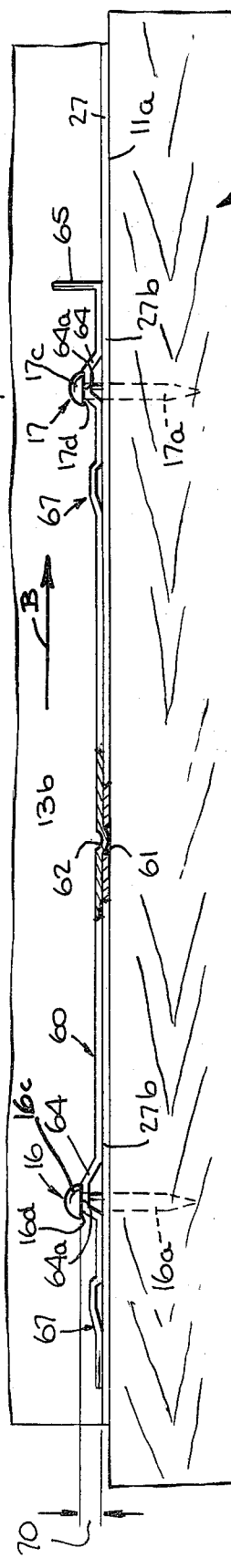
FIG. 6A is an enlarged and fragmentary side elevation, partly in cross-section, of a modified form of connection means in accordance with the invention.
Figure 6B:
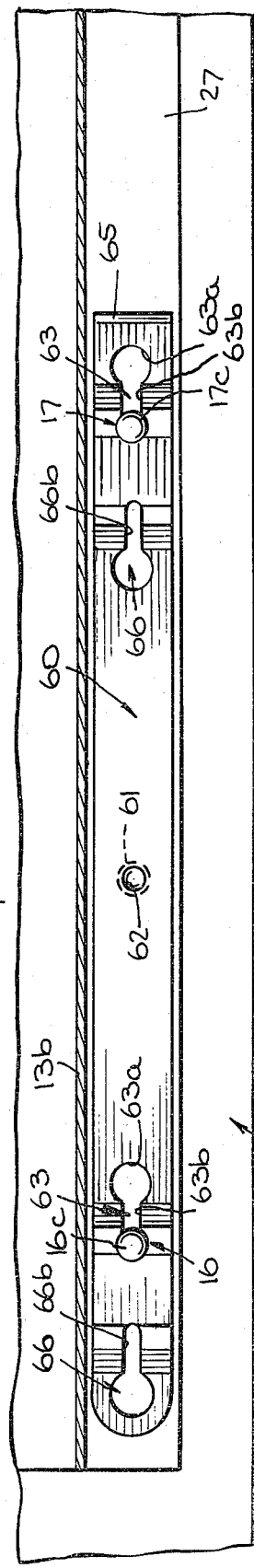
FIG. 6B is a fragmentary plan view of the modified form as seen in FIG. 6A.

Referring now to FIGS. 6A and 6B, a modified and preferred form of locking clip 60 is illustrated, which is used in the same manner as the locking clips 30 to press and lock furniture components, such as the pedestal flange 27 and the desk top 11, in engagement with each other. As described in connection with the previous embodiment, the flange 27 is provided with slot openings 27b which are passed over the fixed table top studs 16, 17 as the furniture components 13 and 11 are placed together. However, the flange 27 is also provided with a locking cutout, such as the aperture 61, at a location such as midway along its length between the slots 27b, to receive a downwardly projecting locking detent 62 of the clip 60 correspondingly located along the length of the clip, when the latter is in its fully engaged position, thus to lock the clip against dislodging movement.

The clip 60 engages the studs 16 and 17 via the pair of keyhole slots 63 whose circular aperture portions 63a are large enough in diameter to pass over the respective heads 16c, 17c of the studs. Their slot portions 63b slidably engage the shanks 16a, 17a of the respective studs 16, 17 during the locking movement, as described in connection with the previous embodiment.

However, each substantially arcuate, upwardly protruding spring portion 64 of the clip 60 has a horizontal and flat apex 64a whose height need only be equal to, or only very slightly higher than the projecting distance 70 (FIG. 6A) of the stud shoulders 16d, 17d above the flange 27. Thus, the clip slides more easily in lateral direction as the spring portions 64 move under and engage the connection shoulders 16d, 17d in response to manual pressure, in the direction of the arrow B, exerted on the upturned finger-engagement portion 65 of the clip 60. Yet, upon engagement of the locking detent 62, which snaps into the locking aperture 61, the clip 60 is securely locked in its fully engaged position.

Of course, each clip 60 may be disengaged by exerting manual pressure in opposite direction on the clip portion 65, sufficient to cause the detent 62 to ride up and out of the flange locking aperture 61, the clip 60 being made of resilient material, such as resilient steel strip as has been described, for the purpose.

The clip 60 further has an additional pair of similarly spaced-apart keyhole slots 66, whose slot portions 66b preferably face in opposite direction from that of the slot portions 63b. These additional keyhole slots 66 have flat-apexed spring portions 67 which are shaped similarly to the spring portions 64 but which have significantly lower height, as seen in FIG. 6A. Thus, the same clip 60 is adapted to be used for similarly connecting furniture components where the flange element, on one of the components, has greater thickness than that of the flange element 27 which is engaged by the previously described clip spring portions 64, and the heads of the fixed studs on the other of the connected components project outwardly from the surface of the component the same common distance as do the stud heads 16c, 17c. That is, the difference between the height of the respective spring portions 64 and 67 is equal to the difference between the respective thicknesses of the two diifferent weight materials of which the contemplated different flanges are made.

The clip 60 will slide laterally into engagement with similar ease in either case, and will be locked in its engagement in either case by the locking detent 62 of the clip, which will engage correspondingly located locking apertures, such as the aperture 61, in each of the flanges.

Thus, connection means for assembling furniture has been described which achieves all of the objects of the invention.

What is claimed is:

1. Furniture connection means connecting the underside of a horizontal top component of the furniture to a horizontal and longitudinally extending flange on a supporting component of the furniture which are in face-to-face contacting relation, said connection means comprising means defining a plurality of spaced-apart apertures through said flange along the length thereof, a corresponding plurality of correspondingly spaced-apart studs respectively attached to, and projecting outwardly from said underside of the furniture top component and extending through respectively associated ones of said apertures in said flange portion, each said stud having a shank and a laterally protruding head on the outwardly projecting end of said shank, said heads providing connection shoulders of said studs facing towards, and spaced a common distance away from said flange, and at least one elongated locking clip retaining said face-to-face contacting relation of said flange and said top component, each said locking clip being of thin, resilient and initially flat material and having length to extend across the locations of at least two adjacent ones of said studs and further having at least one pair of substantially arcuate protrusions in the same direction out of its initial plane to provide at least one pair of spring portions of the clip in longitudinally spaced-apart relation within the length of the clip corresponding to the spacing between said two adjacent ones of said studs and having common height at least equal to said spacing distance of said stud shoulders away from said flange, said pair of spring portions being between and engaging said flange and the respective of said shoulders of said two adjacent studs, and each said clip further having means defining a keyhole-shaped opening therethrough associated with each said spring portion, each said opening having a slot portion and widened aperture portion at an end of said slot portion, said aperture portions of said openings being located within said initial plane of the clip and having size to receive one of said stud protruding portions therethrough, and said respective slot portions of said openings associated with said one pair of said spring portions facing in the same direction relative to the length of said clip and respectively extending from its said associated aperture portion across its said associated spring portion protrusion, each of said slot portions being in slidable engagement on the stud shank beneath the connection shoulder of said stud which is associated with the spring portion.

2. Furniture connection means according to claim 1 wherein each of said spring portion protrusions has a flat apex extending parallel to said initial plane of the clip material and height which is substantially equal to said spacing distance of its said associated stud connection shoulder above said flange, each said locking clip further having a detent projecting out of its said initial plane towards said flange at a location along the length of the clip, and said flange having means defining a cutout for receiving said detent in snap-in relation when the said spring portions of the clip engage said stud shoulders.

3. Furniture connection means according to claim 1 wherein each of said spring portion protrusions has height above said initial plane of the clip which is greater than said spacing distance of its said associated stud connection shoulder above said flange, whereby the spring portion is deflected towards said initial plane of the material and is under resilient pressure between said stud connection shoulder and said flange.

4. Furniture connection means according to claim 3, wherein each of said slot portions of said openings associated with said spring portions extends to an end thereof at a location beyond the apex of said arcuate protrusion with which the slot portion is associated whereby, when said spring portions are in their said engagement positions engaging said stud shoulders and when said ends of said slot portions are abutting said stud shanks, the apexes of said arcuate protrusions are disposed above the plane of said stud connection shoulders to thereby substantially lock said clip in said engagement.

5. Furniture connection means according to any of claims 1, 2, 3 or 4 wherein said horizontal top component of the furniture is a desk top and said supporting component of the furniture is a desk pedestal, and said horizontal and longitudinally extending flange is attached to, and projects laterally from, and along one of the sides of said pedestal.

* * * * *